June 25, 1963 A. CALDWELL 3,094,708
INDOOR-OUTDOOR SWIMMING POOL AND ENCLOSURE THEREFOR
Filed Feb. 7, 1958 12 Sheets-Sheet 1

INVENTOR.
Alfred Caldwell.
BY
Olson, Mecklenburger, von Holst,
Pendleton & Neuman. Attys.

June 25, 1963 A. CALDWELL 3,094,708
INDOOR-OUTDOOR SWIMMING POOL AND ENCLOSURE THEREFOR
Filed Feb. 7, 1958 12 Sheets-Sheet 4

INVENTOR.
Alfred Caldwell.

June 25, 1963 A. CALDWELL 3,094,708
INDOOR-OUTDOOR SWIMMING POOL AND ENCLOSURE THEREFOR
Filed Feb. 7, 1958 12 Sheets-Sheet 5

INVENTOR.
Alfred Caldwell

June 25, 1963  A. CALDWELL  3,094,708
INDOOR-OUTDOOR SWIMMING POOL AND ENCLOSURE THEREFOR
Filed Feb. 7, 1958  12 Sheets-Sheet 12

United States Patent Office 3,094,708
Patented June 25, 1963

3,094,708
INDOOR-OUTDOOR SWIMMING POOL AND ENCLOSURE THEREFOR
Alfred Caldwell, 1351 W. Wilson Ave., Chicago 40, Ill.
Filed Feb. 7, 1958, Ser. No. 713,997
5 Claims. (Cl. 4—172)

The present invention relates to an indoor-outdoor swimming pool assembly and to an enclosing building for use therein.

More particularly, this invention relates to a combination comprising a swimming pool, an adjacent structure having dressing and other facilities, referred to generally herein as a "bathhouse," and a novel, readily-movable enclosing building which may be positioned over the pool and connected to the bathhouse or moved to a location remote therefrom.

With the enclosing building positioned about the pool and abutting the bathhouse, there is formed an indoor pool with connecting dressing facilities suitable for use in extreme winter weather and whenever an indoor enclosed pool is desired. By moving the enclosing building to a location remote from the pool, the pool is transformed into a completely exposed outdoor pool with an adjoining bathhouse which is desirable in summer.

The enclosing building forming part of the present invention comprises a substantially spherical dome supported by a substantially circular side portion inwardly tapering toward the bottom. Although it must be large enough to cover a good-sized swimming pool, such as an Olympic or 25-meter pool with a length of approximately 82 feet, it is light enough to be moved readily back and forth from a position covering the pool to a remote location.

The dome of the enclosing building is preferably supported entirely by the side portions, with the interior of the building completely open and free from obstructions. Moreover, the dome is preferably formed without any support or bracing other than that of the dome frame and the covering or skin therefor, which is stressed and so constructed that there is no outward thrust at the bottom thereof. Accordingly, the entire space above the pool and the area about the pool is completely open on the order of a bubble.

The resulting construction is very rigid, strong and light, so that it may withstand high winds, heavy snows, and any stresses and strains due to its being moved as intended.

The enclosing building is capable of many uses when located remote from the pool, such as in the summertime. It is admirably suited for a theatre, either with a stage at one side and seats in front thereof, or more particularly, for a "theatre in the round" with the stage centrally located and seats on all sides thereof. It may also be used as a building housing a roller-skating rink, or for lectures, exhibits, flower shows, hobby shows, etc.

The bathhouse may also serve many purposes other than to merely provide dressing facilities. It may include a checkroom and sanitary facilities for those using the pool. Restaurants, concession stands, water-treating equipment and power mechanism for moving the building structure may also be located within the so-called bathhouse. Another use of this building is to provide dressing rooms for participants in other sports played in the area thereabout and, if desired, as a shelter in winter for ice-skaters using a nearby rink.

The present invention is therefore particularly suited for use in playgrounds and parks where it may be continuously used throughout the year for many purposes by a maximum number of people.

An object of the present invention is to provide an indoor-outdoor swimming pool which may be completely enclosed or completely exposed as desired.

Another object is to provide a swimming pool and adjoining bathhouse with a building structure which may connect with the bathhouse to form a complete enclosure for the pool and dressing facilities or may be moved therefrom to a remote area, leaving the pool exposed and the bathhouse readily available.

A further object is to provide a building construction which may be positioned to include a swimming pool or be moved away therefrom.

Still another object is to provide such a building construction which is strong and light.

A still further object is to provide such a building construction which is supported only adjacent the sides thereof.

Another object is to provide such a building construction which may be readily assembled.

An additional object is to provide a building construction of the above type mounted on rails or other guide means to guide and facilitate its movement from about the pool to a remote position.

Further objects and advantages will be apparent from the following descriptions and claims when considered with the accompanying drawings in which:

FIG. 24 is an exploded view of the triangular cover portion shown in FIG. 19.

Figure 1:
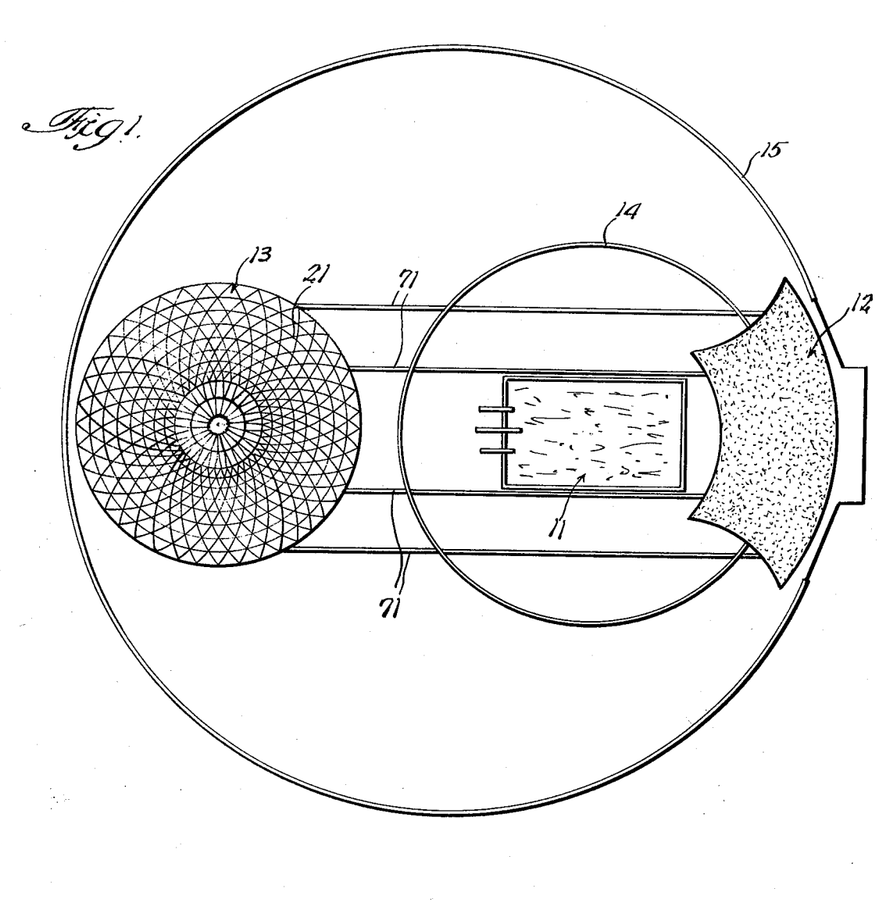
FIGURE 1 is a top plan view of an indoor-outdoor swimming pool embodying the present invention with the pool exposed.
Figure 2:
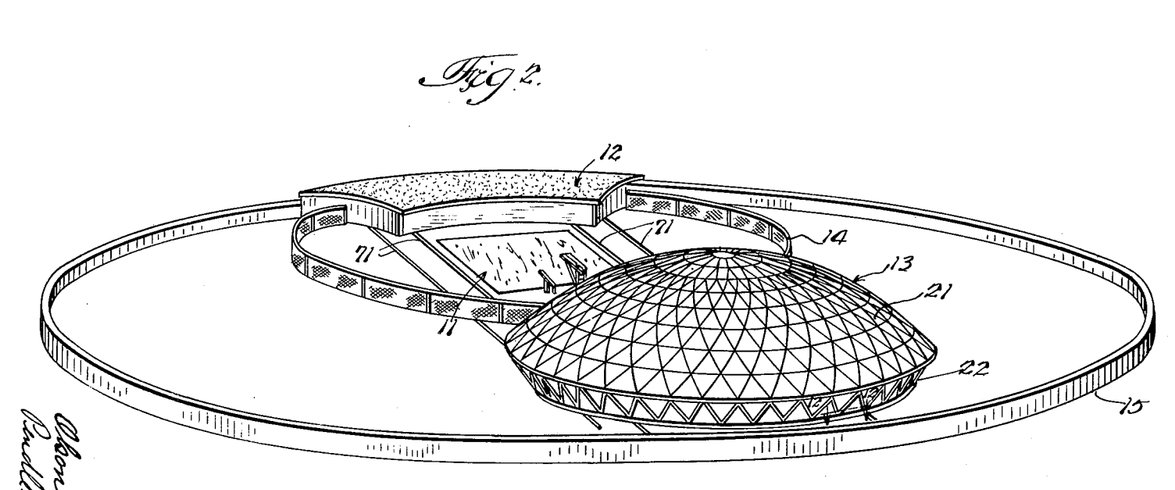
FIG. 2 is a perspective view of the indoor-outdoor swimming pool shown in FIG. 1.
Figures 2A, 3, 31, 32, 33:
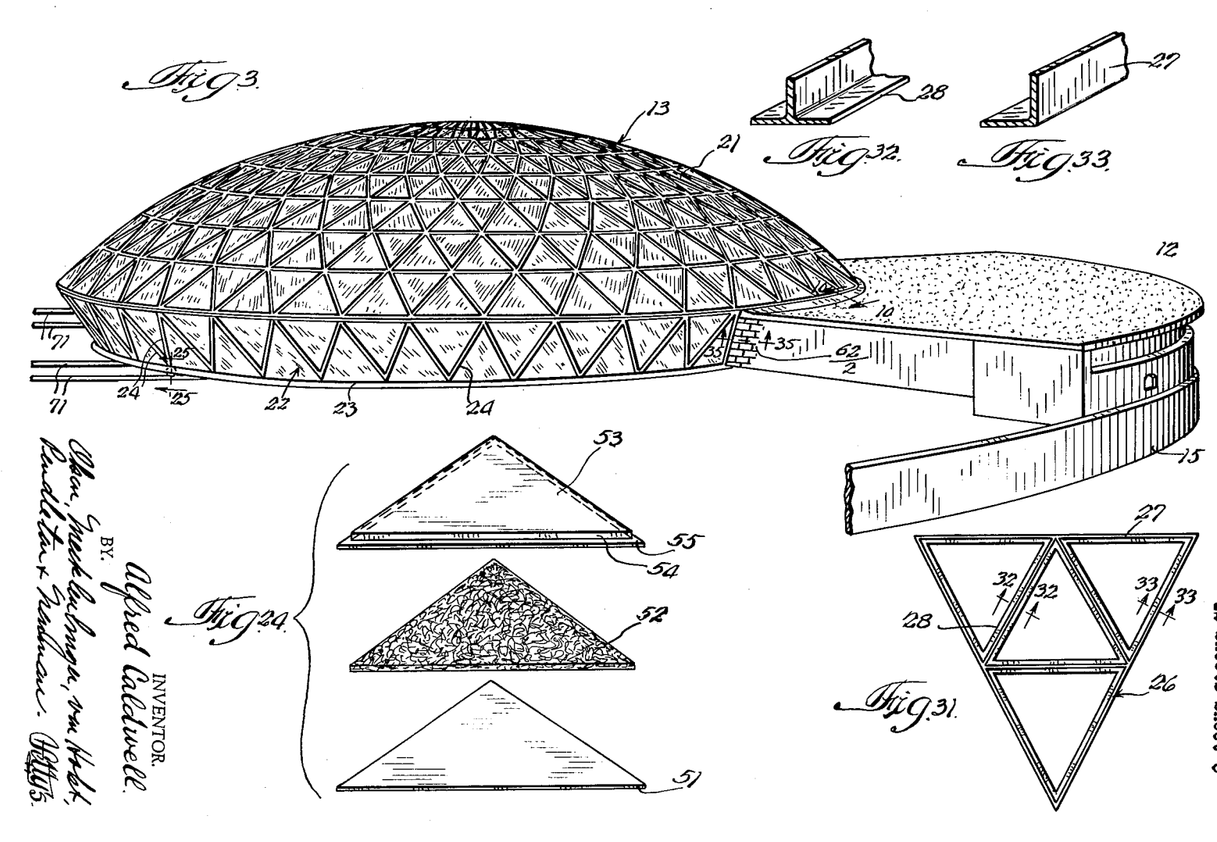
FIG. 3 is an enlarged perspective view of the construction in FIG. 1 with the enclosing structure positioned over the pool to enclose it.
FIG. 31 is a side elevational view of a triangular frame member used in the side wall between mullions.
FIG. 32 is a cross-sectional view in perspective of a part of the side frame taken on the line 32—32 of FIG. 31.
FIG. 33 is a cross-sectional view in perspective of a portion of the side frame taken on the line 33—33 of FIG. 31.
Figure 4:
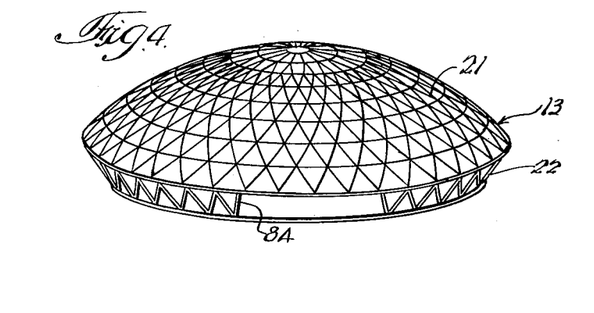
FIG. 4 is a perspective view of the enclosing building forming a part of the indoor-outdoor pool assembly showing the wide opening for connecting with the bathhouse.

Referring to the drawings and, more particularly, to FIGS. 1, 2 and 3, there is shown an indoor-outdoor pool embodying the present invention, comprising a swimming pool 11, a bathhouse 12, and an enclosing structure 13, which is intended to be moved from a position remote from the pool such as shown in FIGS. 1 and 2 to a position over the pool and abutting the bathouse 12 as illustrated in FIG. 3.

It may be desirable to have a fence or enclosure 14 surrounding the pool which is so constructed that part of it may be taken down whenever it is desired to move the pool from the position of FIG. 1 to the position of FIG. 3, or vice versa. If desired, a fence or enclosure 15 may also be employed to surround the area and prevent the entry therein of unauthorized personnel. The fences obviously may be dispensed with if so desired.

The pool shown in the drawings may be a regulation 25-meter pool approximately 82 feet long and about 51 feet wide. Larger or smaller pools may be employed.

The bathhouse 12 is located adjacent the end of the pool nearest the outside or enclosure 15. It will normally have dressing facilities, showers, toilets, checkroom, and may also have a restaurant or provide other services. As shown in the drawings, the bathhouse is adjacent the outside of the area enclosed by the fence 15, so that all persons entering the pool or the area about it may be required to pass through the bathhouse. If a charge is made for the use of the facilities this also would be done in the bathhouse.

The enclosing building 13 is preferably of the construction illustrated having a spherical dome 21 and a circular side portion 22 extending downwardly and somewhat inwardly from the periphery of the dome. The side 22 of the enclosing building 13 is preferably supported on a compression ring 23. Mullions 24 extend upwardly from the compression ring 23 in a zig-zag arrangement forming a series of V's with the upper edges of each connected to the upper edges of adjoining V's on each side thereof, thereby forming a continuous truss about the building except for doors and openings formed in the sides.

Figure 26:
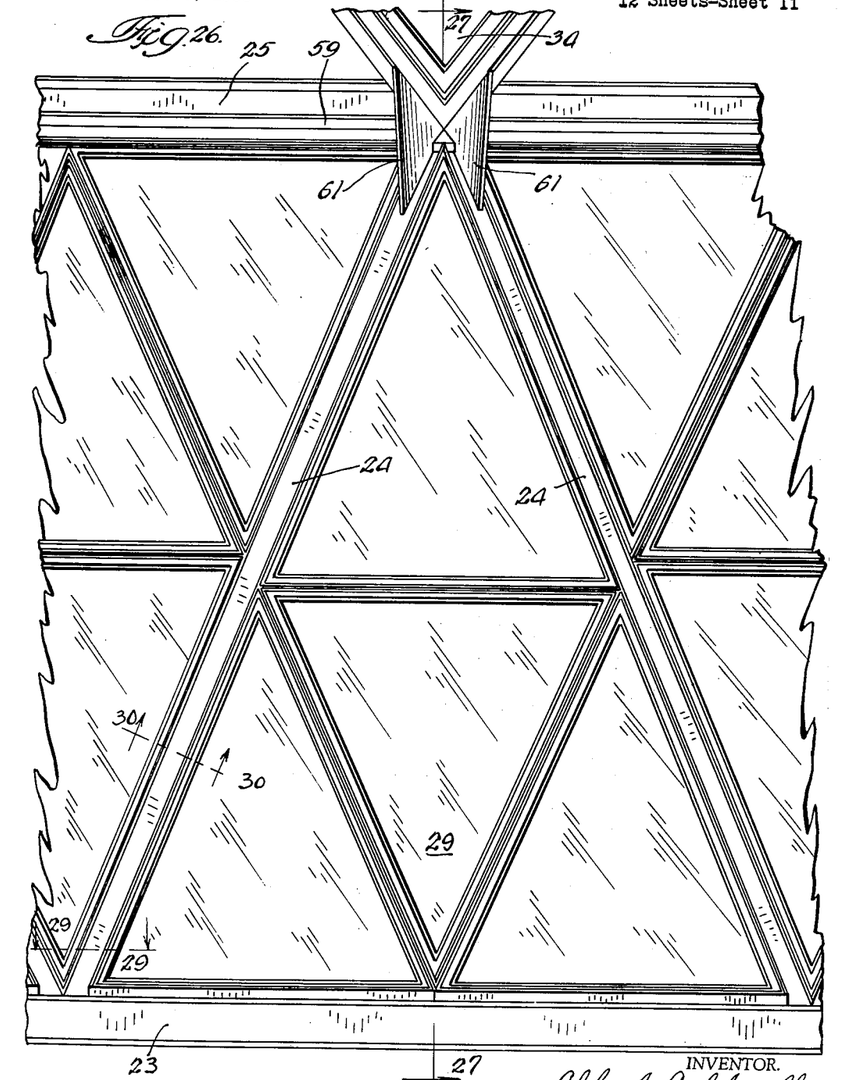
FIG. 26 is an interior side elevational view of a section of the supporting side wall of the building.
Figures 27, 28, 35:
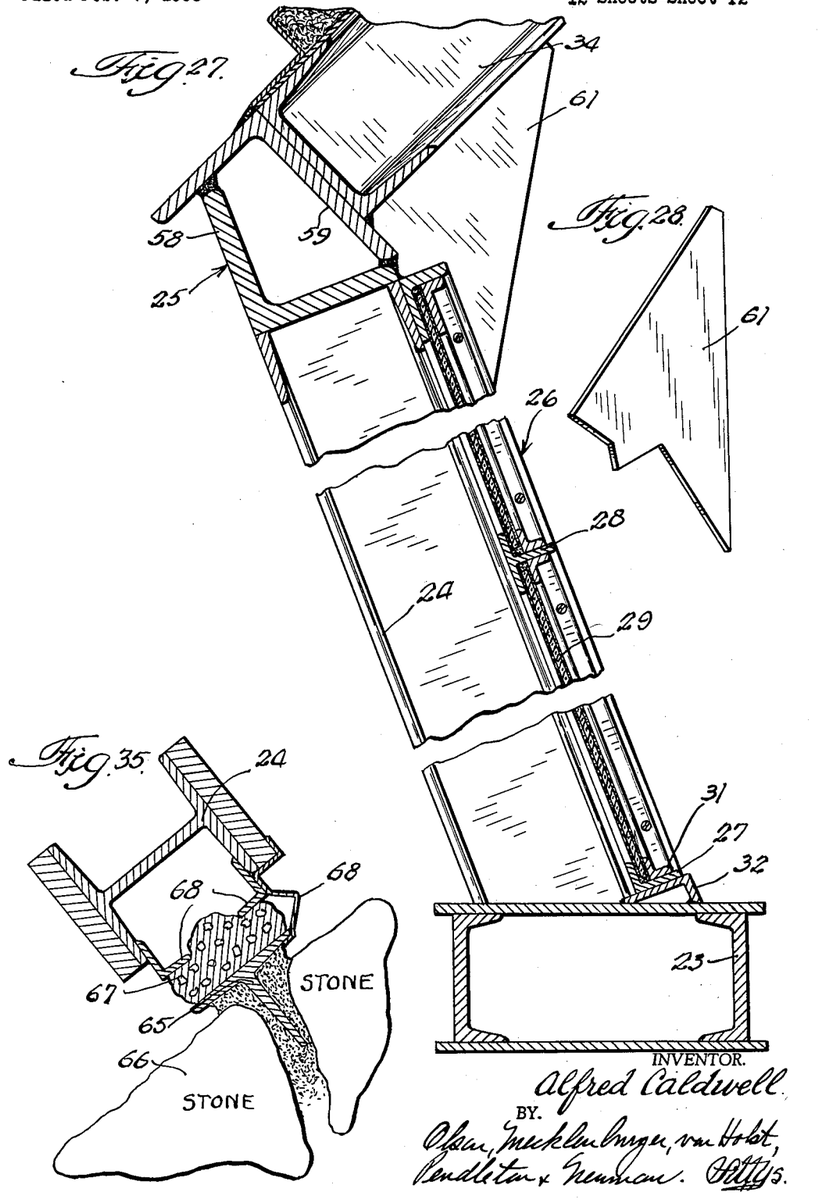
FIG. 27 is a cross-sectional view taken on the line 27—27 of FIG. 26.
FIG. 28 is a perspective view of the gusset plate shown in FIGS. 26 and 27.
FIG. 35 is a cross-sectional view of the connection between the enclosing building and the side of the bathhouse taken on the line 35—35 of FIG. 3.
Figure 29:
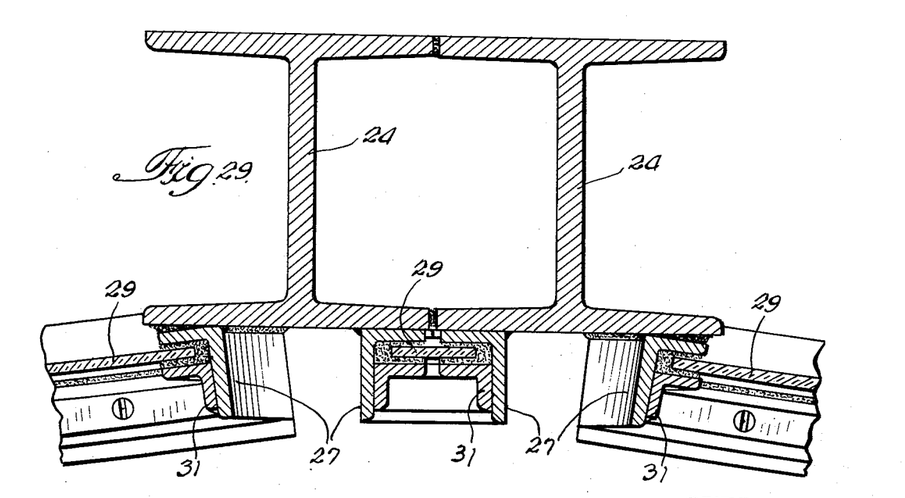
FIG. 29 is a cross-sectional view taken on the line 29—29 of FIG. 26.

The mullions 24, shown particularly in FIGS. 26, 27, 29 and 30, are preferably in the form of I-beams mounted on the compression ring 23 in a truss formation and extending upwardly and outwardly therefrom (FIG. 27). They are welded together where they connect at both their upper and lower ends, and the lower ends are also secured by welding or other suitable means to the compression ring 23. Secured to the top of the mullions 24, also preferably by welding, is a retaining ring 25 as shown in FIGS. 26 and 27.

This construction, consisting of the compression ring 23, mullions 24 in truss formation and retaining ring 25, forms a strong rigid framework for the sides of the enclosing building. The truss formation formed by the mullions extends completely around the wall of the building structure except where doors or other required openings are formed therein. As the mullions may be formed of aluminum, if desired, the wall structure is relatively light in weight, while having extremely high strength.

The walls may be enclosed by side frame members 26 such, for example, as the window frames shown in FIGS. 31, 32 and 33 when glass or other suitable material is mounted therein. These side frame members 26 are triangular and of a size and shape to cover the triangular areas between adjacent mullions. They may comprise peripheral angle members 27 and T-members 28 connecting substantially the midpoints of adjacent sides thereof forming four similar triangular areas. Glass panes 29 or suitable panels of other materials are secured in the triangular areas, bounded by the members 27 and 28. The panes 29 abut the flanges of the frame members 27 and 28 and may be held in place by retaining members 31 formed from angle members of aluminum or other suitable material (FIG. 33) which fit over the panes and are removably secured to the sides of the frames.

The side frame members 26 are preferably welded to the inwardly facing flange surfaces of the mullions 24 with their lower edges supported on an angle member 32 fixedly secured to the top of the compression ring 23 by welding or other means. The width of the sides of the angle member 32 is such as to provide a supporting surface substantially normal to the walls.

Figures 5, 6:
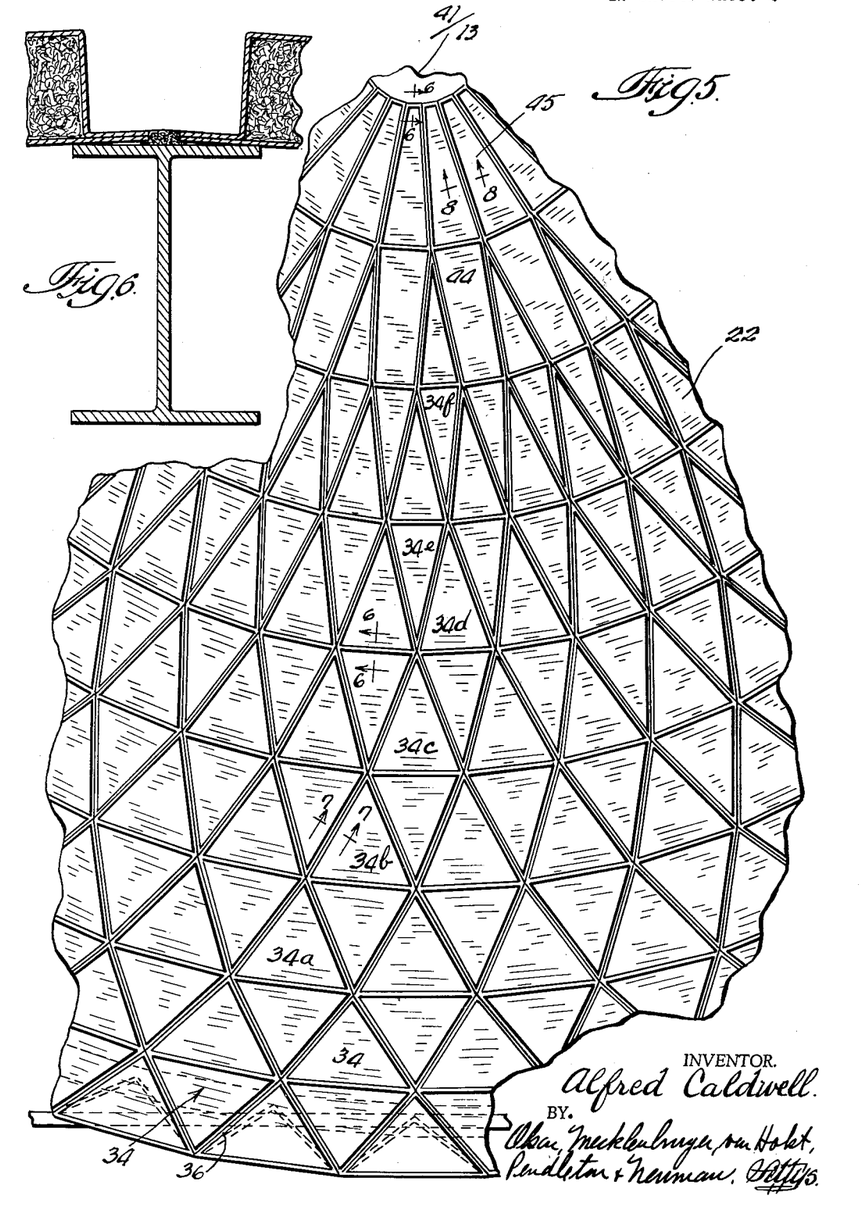
FIG. 5 is an enlarged plan view of a portion of the dome of the enclosing building.
FIG. 6 is a cross-sectional view taken on the line 6—6 of FIG. 5.
Figures 11, 12, 15, 16, 17, 18:
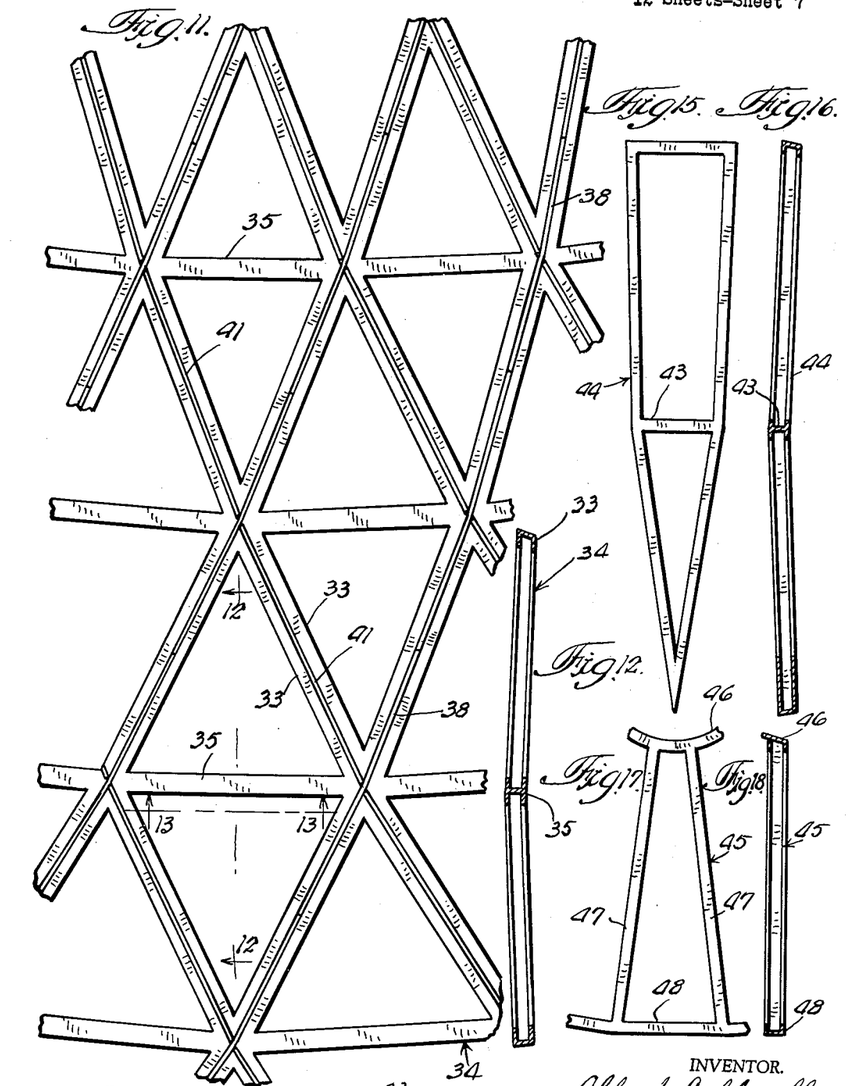
FIG. 11 is an enlarged view of a portion of the dome framework.
FIG. 12 is a longitudinal cross-sectional view taken on the line 12—12 of FIG. 11.
FIG. 15 is a generally triangular dome frame member used at the inner portion of said dome.
FIG. 16 is a side elevational view of the frame member shown in FIG. 15.
FIG. 17 is a form of quadrangular frame member employed adjacent the center of said dome.
FIG. 18 is a side elevational view of the frame member shown in FIG. 17.
Figure 14:
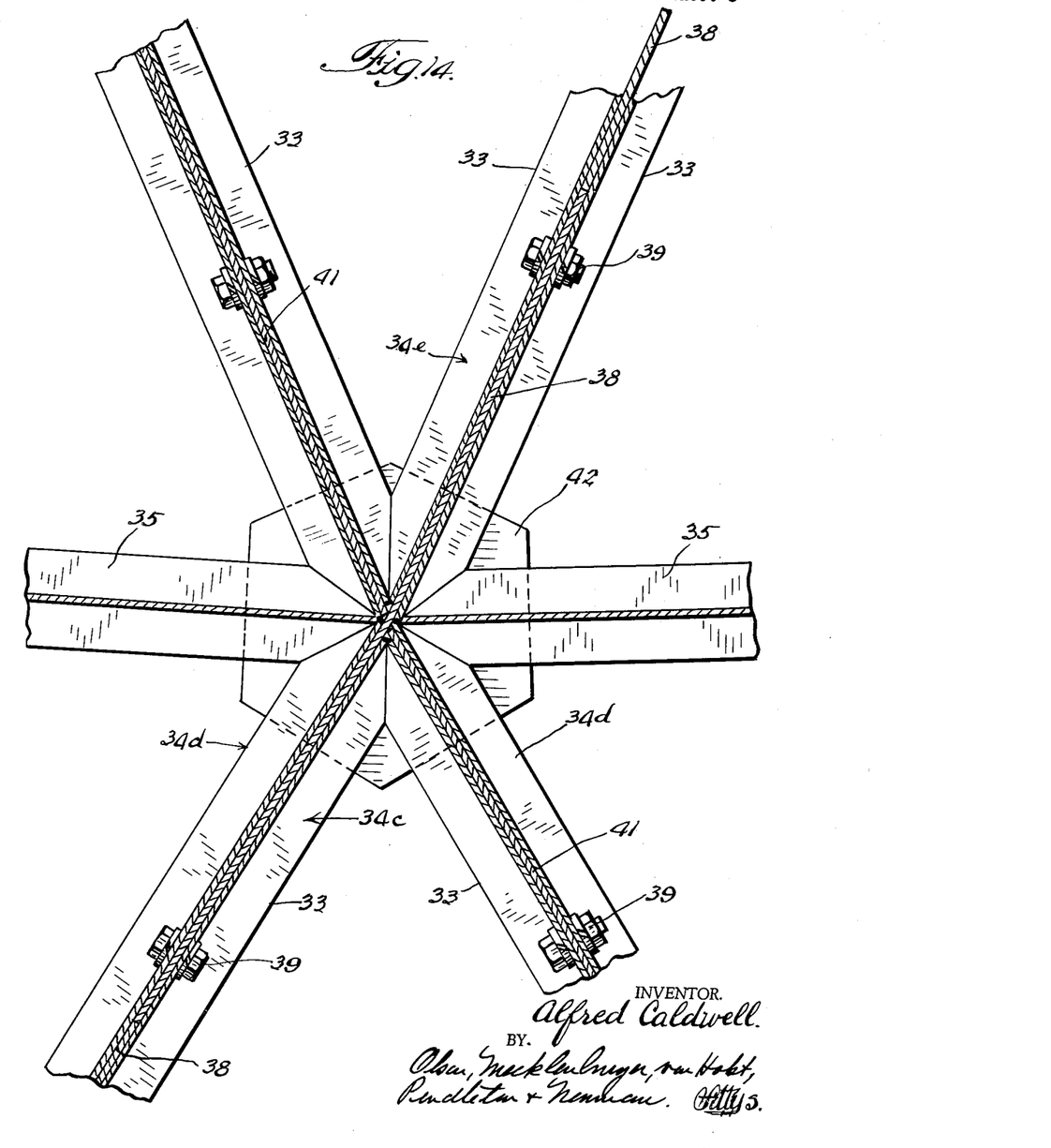
FIG. 14 is an enlarged plan view partly in section of an intersection of four of the dome frames shown in FIG. 11.
Figures 19, 20, 21, 22, 23, 30, 34:
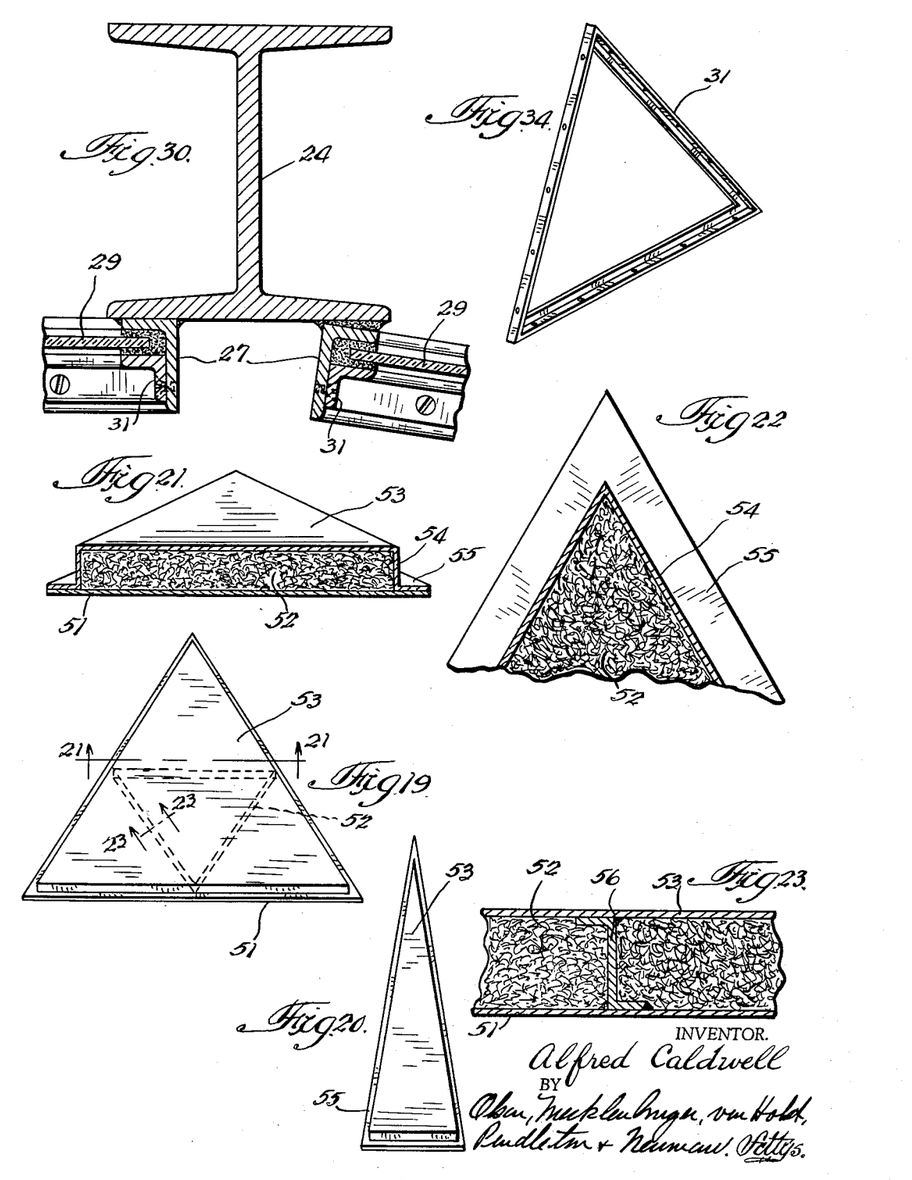
FIG. 19 is a perspective view of a triangular cover portion employed in the dome of the enclosing building.
FIG. 20 is a perspective view of a narrower triangular cover portion employed near the center of the dome.
FIG. 21 is an enlarged transverse cross-sectional view in perspective of a triangular cover portion taken on the line 21—21 of FIG. 19.
FIG. 22 is an enlarged plan view partially in cross section of one corner of the triangular cover portion shown in FIG. 19.
FIG. 23 is a cross-sectional view taken on the line 23—23 of FIG. 19.
FIG. 30 is a cross-sectional view taken on the line 30—30 of FIG. 26 showing a mullion used in the side wall of the building.
FIG. 34 is a perspective view of one of the triangular securing members for securing a cover member in the side frame shown in FIG. 30.

The spherical dome structure of the enclosing building is shown in detail in FIGS. 5, 11 and 14. In its preferred form there is a framework or supporting structure made up of a number of elements, most of which are diamond-shaped. However, a few are generally triangular and the innermost ones are generally quadrangular.

Figure 13:
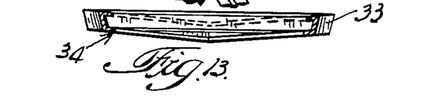
FIG. 13 is a transverse cross-sectional view taken on the line 13—13 of FIG. 11.

The outer sides 33 of the diamond-shaped members 34 are preferably formed of inwardly facing channels (FIGS. 12 and 13) with I-shaped reinforcing members 35 extending between opposite sides and serving to divide the diamond-shaped members into two substantially equal triangular parts. In order to provide for the curvature in the dome, the two portions of the diamond-shaped members on each side of the reinforcing bars 35 are at a slight angle to each other.

As shown in FIG. 5, the diamond-shaped members are arranged in zones about the center of the dome with their long dimensions extending along lines or longitudinals radiating from the center of the dome. The diamonds are all preferably formed with sides of substantially equal length. However, their width decreases as their distance from the center of the dome decreases.

The widths of the zones about the center of the dome are equal to one-half the length of the diamonds. Thus, the zones increase in width as they approach the center of the dome. The diamonds in the two outermost zones are the widest and the spaces between the outer ends thereof are filled with triangular-shaped frame members 36 having their sides formed of inwardly facing channels. The diamond-shaped frames 34a in the next row inwardly lie in the second and third zones from the periphery of the dome and overlap and fit between the outermost row of diamond frames.

For the purpose of securing the diamond-shaped and other frame members together to form a unitary construction, a series of flat reinforcing bars of a width preferably slightly less than the width of the flanges of the channels 33 are employed. These reinforcing bars are positioned between the outer sides of adjacent diamonds as appears in FIGS. 7 and 11. One form of reinforcing bar 38 overlaps the joint between two longitudinally aligned diamonds 34c and 34e (FIG. 14). The opposite ends of the reinforcing bar 38 are at a slight angle to each other to compensate for the narrower width of the diamond 34e with respect the diamond 34c. As illustrated in FIG. 14, the lower end of the reinforcing bar 38 lies between the left side of the upper half of the diamond frame 34c and the right side of the interfitting diamond 34d adjacent thereto. These members are initially secured together by suitable means such as nuts and bolts 39. The upper end of the reinforcing bar 38 is positioned between the lower right-hand side of diamond 34e and the upper left-hand side of the diamond 34d adjacent thereto, these members being held together by similar bolts 39.

In the arrangement shown, the reinforcing bars 38 may be approximately the length of one-half a diamond. The ends of the reinforcing bars 38 abut the ends of the adjacent reinforcing bars 38, and each aligned group of reinforcing bars is substantially in the shape of a parabola, extending from the outer periphery of the dome to adjacent the center thereof as appears in FIG. 5. Each of these reinforcing bars 38 is bent slightly intermediate its ends and extending through an intersection point between four diamonds with the bend at the junction point to compensate for the difference in width of the diamond-shaped frame members in different zones (FIG. 14). A second set of straight reinforcing bars 41 positioned between adjacent sides of the diamonds may extend from one junction point to the next adjacent junction point terminating at opposite sides of the reinforcing bars 38.

The groups of aligned reinforcing bars 41 are also substantially parabolic-shaped and likewise extend from the periphery of the dome to adjacent the central portion thereof intersecting some of the aligned groups of reinforcing bars 38. The ends and side midpoints of the diamonds forming the intersections are preferably welded to each other and to a joint plate 42 as shown in FIG. 14.

In the dome construction shown in FIG. 5 there are seven annular rows of diamond frames indicated at 34, 34a, 34b, 34c, 34d, 34e and 34f arranged in zones about the center of the dome, the diamonds gradually decreasing in width from the outermost zone to the innermost zone.

As previously pointed out, the supporting structure of the dome is largely made up of diamond-shaped members 34–34f. Between the narrow ends of the diamond-shaped frames 34 at the periphery of the dome there are triangular frames 36. Near the center of the dome the diamond-shaped frame members 34f are spaced from each other a distance substantially equal to the width of these frame members at their central portion. Positioned between the diamond-shaped frame members 34f and the inner ends of the diamond-shaped frame members 34e there are a number of elongated generally triangular members 44 (FIGS. 5, 15 and 16). The frame members 44 have a central transverse reinforcing bar preferably in the form of an I-beam 43 dividing these members into two portions at a slight angle to each other.

Inwardly of the triangular members 44 which are equal in length to the diamond-shaped frames 34f there is an annulus or zone formed of quadrangular-shaped members 45 of reduced widths at their inner ends (FIGS. 5, 17 and 18). This annulus preferably comprises a central cylindrical sleeve 46 with a plurality of I-beams 47 extending substantially radially outwardly therefrom and having the ends of the I-beams 47 connected by inwardly facing channels 48. The ends of channels 48 are also preferably connected to the inner ends of the generally triangular-shaped members 44. The center of the dome inwardly of the sleeve 46 may be left open to provide ventilation at the top of the dome. In this case, a protective cover is provided over the central opening to prevent the entry of rain, snow, etc. If desired, the portion inwardly of the sleeve may be filled in.

The reinforcing bars 38 may extend inwardly between adjacent sides of the diamond-shaped frame members to the inner quadrangular-shaped members 45, and the I-beams 47 extend from there to the sleeve 46. Thus there is formed a rigid frame structure in which the groups of abutting reinforcing members 38 are substantially in the shape of parabolas curved in one direction and extending from the periphery to substantially the center of the dome, and the group of generally aligned reinforcing members 41 are in the shape of parabolas curved in the opposite direction and also extending from the periphery of the dome to adjacent the center thereof intersecting the reinforcing members 38. The transverse reinforcing members 35 of the various frame members form circles or parallels about the center of the dome and define the zone boundaries of the dome as shown in FIG. 5.

The upper surfaces of the I-beam constructions shown in FIGS. 6, 7, 8, 11 and 20–23, some of which are formed by securing the adjacent sides of the frame members together, form relatively broad supporting surfaces over which suitably shaped cover members are secured to make the dome completely weatherproof throughout. Each of the triangular cover members (FIGS. 15–19 and 24) preferably comprises a triangularly shaped base plate 51 of sheet metal or other suitable material, a body of insulation material 52 and a top cover plate 53 having sides 54 and a peripheral flange 55 which overlies the outer edges of the base plate 51 and is also preferably formed of sheet metal. While any suitable type of insulation material may be used, that illustrated is a rigid type such as foam glass. For the larger sized triangular cover members, it may be desirable to provide reinforcing members extending between opposite sides such as Z-bars 56 (FIG. 19).

Most of the cover members are in the shape of isosceles triangles with two sides of equal length which is the same for all the cover members, although their width varies to correspond with the width of the diamond frame members, there being one triangular member of a size and shape to cover each triangular frame member and each half of the diamond-shaped frame members except for the generally triangular-shaped frames 44. With respect to these, triangular cover members fit over the pointed ends thereof and suitably shaped quadrangular members fit over the opposite ends. Quadrangular cover members of the required size and shape also fit over the quadrangular frame members 45. The quadrangular cover members are constructed similarly to the triangular cover members.

Figure 7:
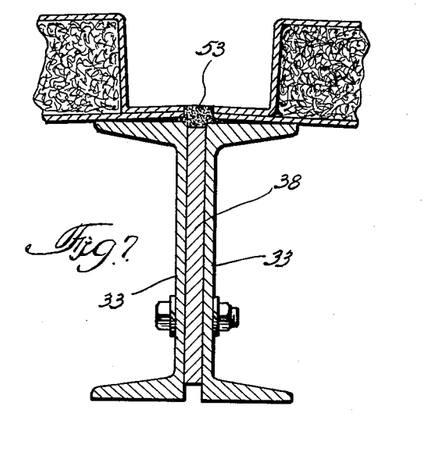
FIG. 7 is a cross-sectional view taken on the line 7—7 of FIG. 5.
Figure 8:
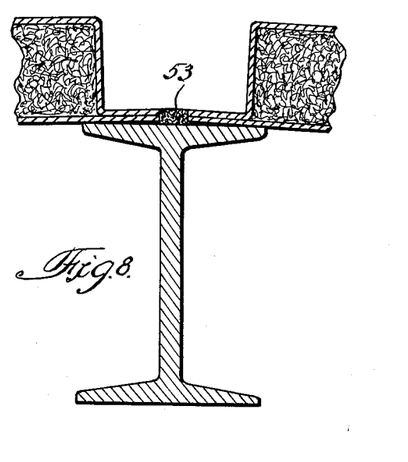
FIG. 8 is a cross-sectional view taken on the line 8—8 of FIG. 5.

The cover members are secured to the upper flanges of the diamond-shaped frame members by any suitable means, preferably by welding, as illustrated in FIGS. 6, 7 and 8. The edges of adjacent cover members are centered over the flanges of the frame members in spaced relation and then welded together and to the supporting frame flange thereunder. In this manner the channels 33 of the adjacent diamond-shaped frame members, the intermediate reinforcing bars 38 or 41 and the cover members are welded together as a unit as shown in FIG. 7 or the cover members and the I-beams are welded together as a unit as shown in FIGS. 6 and 8. This results in a strong rigid dome framework.

Figures 9, 10:
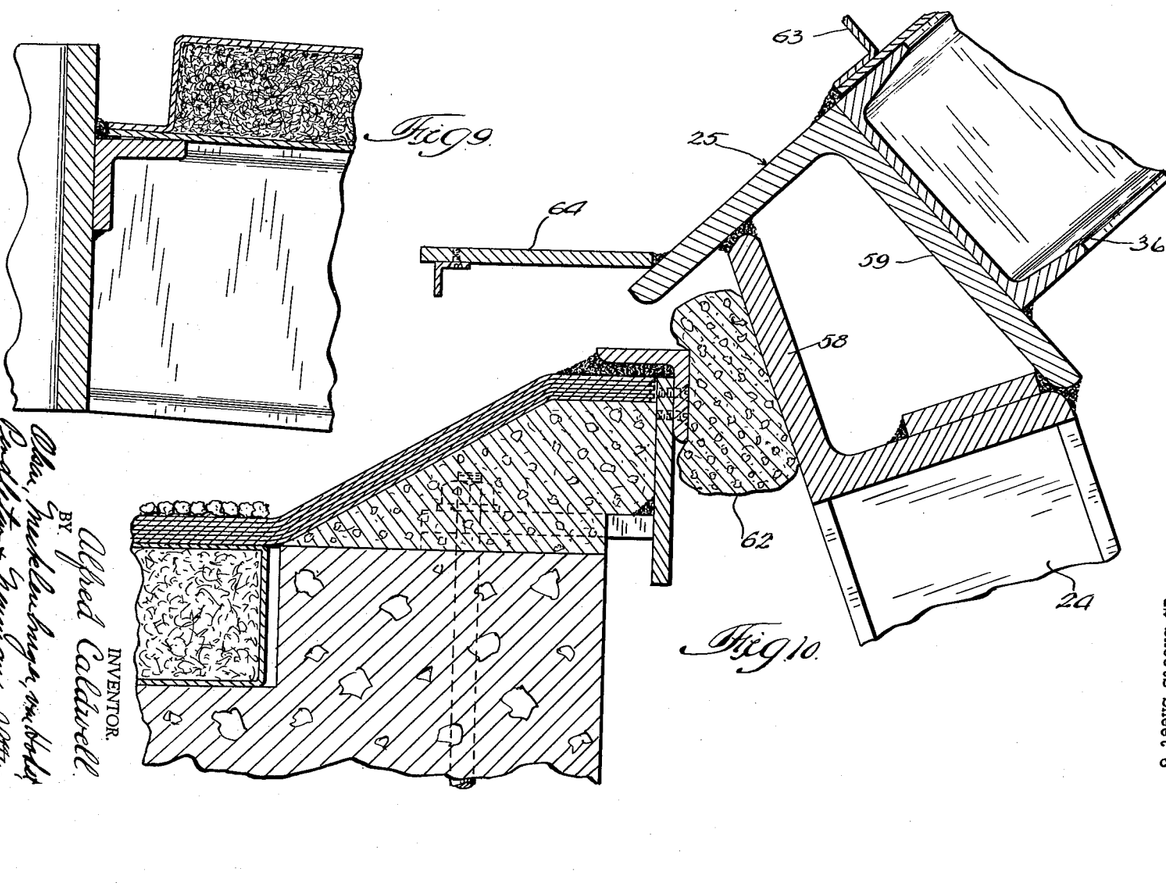
FIG. 9 is a cross-sectional view taken on the line 9—9 of FIG. 5.
FIG. 10 is a cross-sectional view of the connection between the enclosing building and the top of the bathhouse taken on the line 10—10 of FIG. 3.

The connection between the periphery of the dome and the side of the enclosing building is shown in FIGS. 3, 10, 26 and 27. Secured to the top of the mullions 24 and side frame members 26 is the retaining ring 25 preferably formed of a number of straight sections, each of which, as shown in FIGS. 10 and 27, preferably comprises two angle members 58 and 59 welded together forming a hollow beam. One flange of each angle member 58 is secured to the top of the mullions 24 and the other flange thereof extends upwardly from and is aligned with the outer sides of the mullions 24 therebeneath. The inner angle member 59 has one flange extending upwardly from the upper inner ends of the mullions 24 and the other flange thereof extending outwardly and overlying the upper end of the angle member 58, in effect forming an outwardly projecting eave. The outer ends of the diamond-shaped frame members 34 at the periphery of the dome are secured to the retaining ring 25, such as by welding, and gusset plates 61, of a shape to contact the lower sides of the diamond-shaped frame members 34, the inner side of the retaining ring 35 therebelow, and fit over the upper end of the side frames 26, are secured to these members by any suitable means, preferably welding, as shown in FIGS. 26 and 27. The inner sides of the triangular frame members 36 are also welded to the retaining rings 25 intermediate the upper ends of the mullions 24 (FIG. 10).

In order to provide a weatherproof seal between the retaining ring 25 and the upper front portion of the bathhouse, a removable, continuous sponge rubber seal 62 is positioned between the outer side of the retaining ring 25 and the adjacent portion of the bathhouse (FIG. 10). If desired, to further enhance the weatherproofness of this connection, a deflector plate 63 may be mounted on the upper surfaces of the dome adjacent the periphery thereof, and an outwardly extending skirt portion 64 may also be secured to the outer edge of the angle member 59.

A weatherproof seal is also provided between the sides of the bathhouse and the abutting side walls of the enclosing building (FIGS. 3 and 35). A T-shaped member 65 may be embedded in the adjacent wall 66 of the bathhouse and a strip of sponge rubber 67 positioned between the outer surface of the T-shaped member 65 and angle irons 68 secured to the adjacent mullion 24 in the side of the wall. If desired, a continuous strip of tape 68 covering this joint on the inside may also be employed.

This construction provides a sealed weather-tight connection between the bathhouse and enclosing building when the latter is positioned over the pool and abutting the bathhouse. However, it will permit the enclosing building to be readily moved fro this position, shown in FIG. 3, to a remote position such as illustrated in FIG. 2.

The entire enclosing building may be mounted on rollers to permit the building to be readily moved. The roller elements are evenly spaced about the compression ring 23, six being preferable for this purpose with three arranged on each side of the building. The rollers ride in tracks 71 arranged on each side of the pool and extending from adjacent the bathhouse 12 parallel to the long dimension of the pool some distance therebeyond. With the six rollers spaced evenly about the building the outer roller on each side of the building will ride in the outer tracks and the two rollers on each side thereof will ride on the inner tracks. One form of roller and track therefor that may be employed is shown particularly in FIG. 25. The tracks there illustrated are formed of a substantially H-shaped metal beam 72 buried in the ground and supported on a concrete foundation 73 or other suitable base. The center flange 74 of the H-shaped tracks is bent downward slightly in the middle providing a central longitudinal depression.

Figure 25:
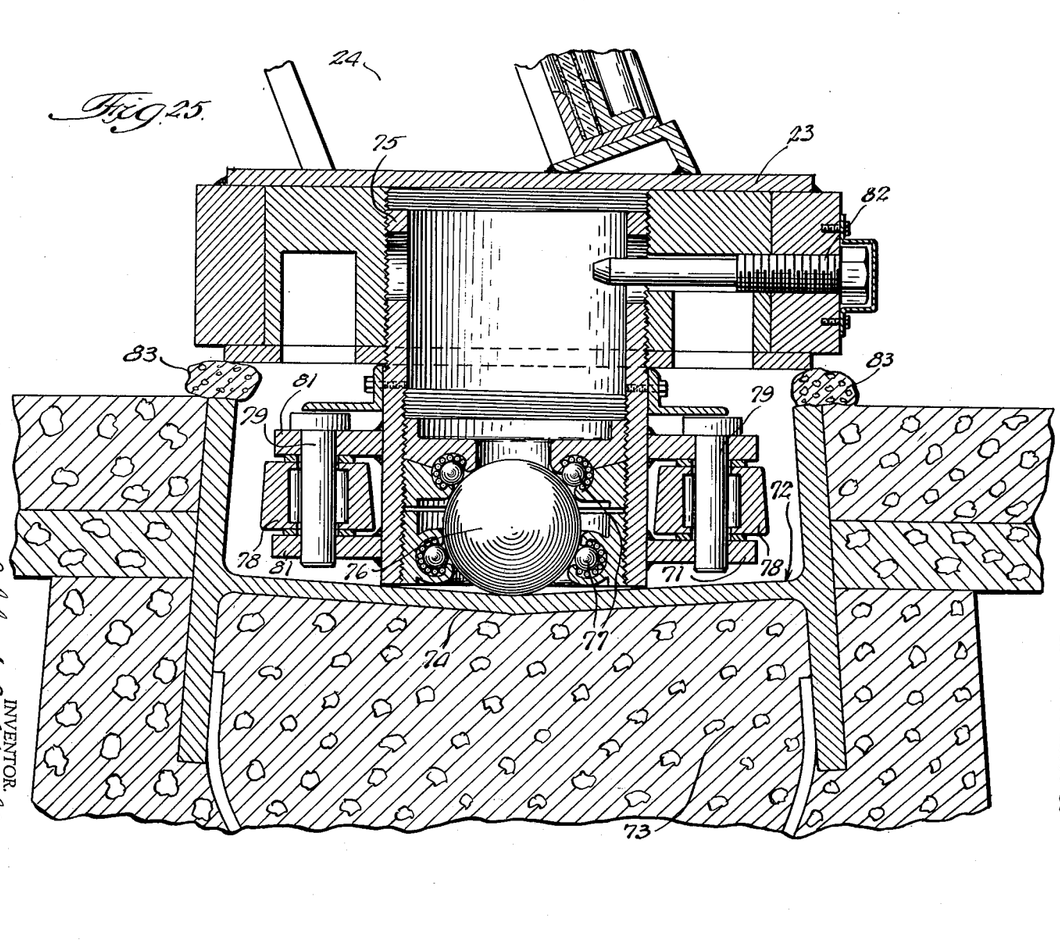
FIG. 25 is a cross-sectional view of a supporting roller and track for the enclosing building taken on the line 25—25 of FIG. 3.

The roller construction employed may comprise an externally-threaded bushing 75 threaded into the compression ring 23 so that it may be vertically adjusted as desired merely by rotating the bushing 75 in one direction or the other. Mounted in the lower end of the bushing 75 there is a large ball 76 which may be made of hardened steel or other similar material arranged to rotate within the smaller ballbearings 77 mounted thereabout. Roller bearings 78 mounted on vertical shafts 79 journaled in supports 81 on opposite sides of the bushing 75 serve to guide the ball 76 and prevent it from moving any substantial distance toward the sides of the tracks 71. A set screw 82 may be secured at one side of the compression ring 23 for preventing unintended rotation of the bushing 75 once it has been properly adjusted.

Any suitable means, such as underground cables, may be employed for moving the building structure 13 from its position over the pool to a position adjacent the outer end of the tracks 71. The opening 84 in the enclosing building is preferably of sufficient size that there will be no interference with most of the pool equipment, such as ladders, low diving boards and the like, during movement of the enclosing building from one position to the other. The mechanism for moving the enclosing building is preferably located in the bathhouse, particularly the basement thereof, and the cables actuated thereby pass from the mechanism to the building through underground conduits. When the building is located in either of its intended positions, the space between the compression ring 23 and the ground therebeneath is preferably sealed off by means of a continuous strip of sponge rubber 83, thus making the building completely tight.

With the present invention there is provided a unitary construction comprising a swimming pool, connecting bathhouse and enclosing building completely surrounding the pool so that it may be used as an indoor pool. The enclosing building is of extremely strong, light construction and may be readily moved from adjacent the bathhouse to a position remote from the pool completely exposing the pool so that if desired, such as in summer, the pool is an ordinary, completely exposed outdoor pool with adjacent bathhouse. Although the enclosing building is preferably substantially circular, it may be rectangular or of other shape.

The enclosing building when remote from the pool is suitable for wide usage, such as a theatre or for exhibitions and the like. The bathhouse is also capable of wide use not only by the swimmers but by others using the surrounding facilities such as baseball players, football players, ice-skaters, etc. Accordingly, with the present invention the pool, the bathhouse, and the enclosing building are all subject to maximum use throughout the entire year.

While particular embodiments of the present invention have been illustrated and described, it is to be understood that various changes and modifications may be made therein. The dome cover portions may be provided with supporting structure as a part thereof and the dome formed from these without additional supporting structure. Moreover, the side frames may be of other forms. Various materials may be employed, although aluminum is generally preferred for maximum strength with light weight. Since many modifications may be made, it is contemplated by the appended claims to cover any such modifications as fall within the true spirit and scope of this invention.

I claim:

1. An indoor-outdoor swimming pool construction comprising a swimming pool and an enclosing structure for selectively completely enclosing said swimming pool, said enclosing structure comprising a fixed bathhouse portion adjacent a side of said pool and in communication with the area about said pool, and a domed enclosing portion of greater lateral dimensions than said pool supported independently of said bathhouse portion for removably connecting with said bathhouse portion, said enclosing portion when positioned over said pool substantially completely enclosing said pool except at one side thereof which is open and abuts said bathhouse portion and forms therewith a unitary structure substantially completely enclosing said pool, said enclosing portion being movably mounted for movement between said position connecting with said bathhouse portion and a position remote from said bathhouse portion and said pool, leaving said pool uncovered, and being capable of use as an enclosing building when remote from said pool and bathhouse portion.

2. The construction of claim 1 having means for effecting movement of said enclosing portion.

3. The construction of claim 1 having guide means extending from adjacent said bathhouse to a position remote therefrom and from said pool, and said enclosing portion being movably mounted on said guide means for movement between said position connecting with said bathhouse and said position remote from said bathhouse portion and said pool.

4. The construction of claim 3 in which said enclosing portion is provided at its lower side with roller means positioned to move over said guide means.

5. Construction of claim 3 in which power means connected to said enclosing portion are provided for effecting movement of said enclosing portion along said guide means.

References Cited in the file of this patent

UNITED STATES PATENTS

| | | |
|---|---|---|
| 1,976,188 | Nozawa | Oct. 9, 1934 |
| 2,019,831 | Ricardo | Nov. 5, 1935 |
| 2,052,217 | Sibour et al. | Aug. 25, 1936 |
| 2,281,981 | LeTourneau | May 5, 1942 |
| 2,670,818 | Hacker | Mar. 2, 1954 |
| 2,682,235 | Fuller | June 29, 1954 |
| 2,711,181 | Woods | June 21, 1955 |
| 2,848,722 | Choporis | Aug. 26, 1958 |
| 2,908,236 | Kiewitt | Oct. 13, 1959 |
| 2,914,074 | Fuller | Nov. 24, 1959 |
| 2,918,992 | Gelsavage | Dec. 29, 1959 |
| 2,924,829 | Mosier | Feb. 16, 1960 |

FOREIGN PATENTS

| | | |
|---|---|---|
| 25,017 | Great Britain | of 1909 |
| 1,818 | Netherlands | Feb. 1, 1917 |
| 844,012 | France | Apr. 11, 1939 |